United States Patent Office 2,795,758
Patented June 11, 1957

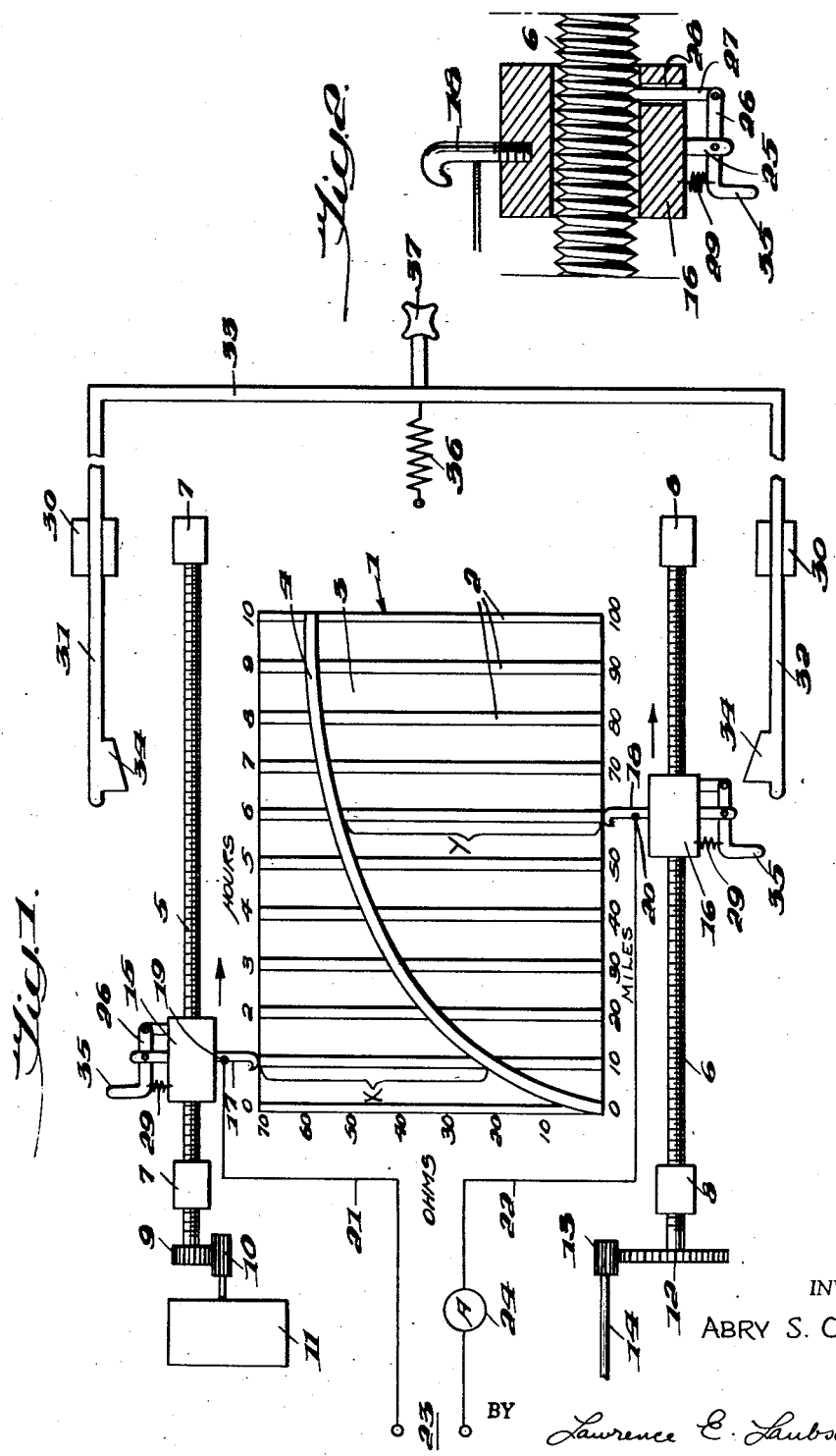

2,795,758

AVERAGE SPEED INDICATING DEVICE

Abry S. Cahn, Jr., Shreveport, La.

Application March 12, 1956, Serial No. 571,050

6 Claims. (Cl. 324—70)

This invention pertains to an average miles per hour indicating device generally, and more particularly to an average miles per hour indicating device utilizing a logarithmic variable resistance unit.

There are many situations in automotive travel today where it is advantageous for the vehicle operator to have an instant indication of the average speed travelled during a given period of time. In travel across time-controlled superhighways, in analyzing traffic problems, in testing engine efficiency over long periods of time, and in measuring gasoline consumption, average speed indication devices prove to be extremely practical. Average miles per hour indicating devices utilizing logarithmic cam means and the like are well known in the art, but these devices are complicated, expensive to manufacture, difficult to maintain in operation, and often do not present a sufficiently precise reading. In order to provide an improved indicating device which will avoid the disadvantages of the prior art, my invention was developed.

The primary object of my invention is to provide a device utilizing logarithmic variable resistance means to present a direct indication of the average speed covered by a vehicle in a given period of time.

A more specific object of my invention is to provide an average speed indicating device utilizing a variable resistance logarithmic resistor having a first movable contact controlled by speedometer cable take-off means and a second movable contact controlled by clock motor take-off means.

Another object of my invention is to provide an average speed indicating device utilizing a logarithmic variable resistor unit with two variable contacts having novel means for quickly resetting the device after a given period of time.

Still another object of my invention is to provide an average speed indicating device utilizing a logarithmic resistor having a plurality of spaced coplanar parallel resistance bars of equal resistance and a logarithmic curve of low resistance placed across and electrically connected to said resistance bars.

Other objects and advantages of my invention will become more apparent from a study of the following specification when considered in conjunction with the accompanying drawings, in which:

Figure 1 is a schematic diagram of my invention, and

Figure 2 is a longitudinal sectional view of one of the movable contact elements.

The average miles per hour covered by a vehicle in a given period of time is equal to the total distance in miles travelled divided by the total hours. Also the log of the average miles per hour is equal to the log of the total miles minus the log of the total hours. In order to totalize the miles covered according to my invention a screw is driven by power take-off means from the automobile speedometer cable, the revolutions of which are directly proportional to the distance travelled. A similar screw and slide may be driven by a clock-type motor. By moving both slides along logarithmic resistors in series, as the miles increase the resistance of the mileage resistance increases logarithmically and as the time increases the resistance of the time resistance decreases logarithmically. Since the resistors are in series, the value of the resultant resistance reflects the logarithmic difference between the log of the miles and the log of the time. By applying a constant voltage across the resistances and including a logarithmic ammeter in series with the resistor, an indication of the average miles per hour will be given.

Referring now to the drawings, the logarithmic resistor shown generally at 1, consists of a plurality of resistance bars 2 mounted a suitable distance apart transverse to the longitudinal axis of the supporting plate 3 made of plastic or other suitable non-conducting material. The resistance bars should be of equal resistance and may be formed of German silver strips or other suitable resistor material. While only eleven resistance bars are shown in Figure 1, it will be apparent the greater the number of bars, the more precise will be the resulting indication. Secured across the resistor bars in the longitudinal direction and electrically connecting said bars is a curve 4 of very low-resistance material. As will be explained below, this curve is formed to have a configuration corresponding to a suitable logarithmic base, as for example, the base 10. While the curve may be secured to the resistance bars by means of electrical soldering connections, the basic resistor lends itself quite readily to manufacture by printed circuit techniques.

Adjacent each edge of the resistor 1 parallel to its longitudinal axis are screw-threaded bars 5 and 6 rotatably mounted in suitable bearing means 7 and 8 respectively. Rigidly secured to bar 5 is pinion gear 9 driven by driving gear 10 mounted on the output shaft of clock 11, which may be either of the spring or electric motor type. Rigidly secured to bar 6 is pinion gear 12 driven by driving gear 13 secured to the flexible cable 14 connected to the speedometer cable shaft. Rotation of the clock output shaft and the speedometer cable cause rotation of bars 5 and 6, respectively, within their bearings.

Mounted on the bars 5 and 6 intermediate their bearings are longitudinally movable slide members 15 and 16 in which are secured the electrical slide contacts 17 and 18. Electrically connected to the slide contacts at points 19 and 20 are the power input leads 21 and 22 from the 6 volt D.-C. power supply 23. Connected in line 22 is ammeter 24 which indicates the current passing through the resistor circuit.

As shown in Figure 2, the movable slide member 16 has an extension 25 in which is pivotally secured arm 26. Pivotally secured at one extremity of arm 26 is a screw-thread engaging member 27 which is slidably guided within opening 28 in the wall of movable slide member 16. Spring 29 is so biased that it urges engaging member 27 in contact with the screw-threaded bar 6 so that upon rotation of the bar within its bearings 8, the slide member 16 will be moved longitudinally with respect to the resistor 1 whereby the contact 18 will traverse the lower ends of the resistance bars 2. Movable slide member 15 similarly cooperates with screw-threaded bar 5 so that the contact 17 will traverse the upper ends of the resistance bars 2.

Slidably mounted within suitable bearing means 30 are the arms 31, 32 of U-shaped reset member 33. Each arm has projections 34 which cooperate with the extensions 35 of the arms 26. Spring 36 tends to urge reset member 33 to the right in Figure 1 so that the projections 34 abut against bearing means 30. If after a given period of time the slidably movable members 15 and 16 are in the positions shown in Figure 1 and it is desired to reset the device, the operator merely presses in on knob 37 and moves the reset member 33 to the left against the tension of spring 36. Projections 34 then contact extensions 35, causing arms 26 to pivot against the tension of springs 29, releasing the engagement of member 28 with the screw-threaded bars and allowing free movement of the slide members 15 and 16 to their initial starting positions against the left bearing members 7 and 8 respectively.

In operation, the slide members 15 and 16 are initially placed against the left bearing members 7 and 8. Contact 17 would electrically contact resistance bar "zero hours" and contact 18 would electrically contact "zero miles." In the particular resistor in Figure 1, for purposes of illustration eleven resistance bars have been shown, each having a resistance of 70 ohms. The revolutions of the speedometer take-off shaft 14 are directly proportional to the distance travelled so that by gearing means 12, 13 the milage contact 18 is driven across the length of the resistor 1 according to any distance travelled (100 miles in Figure 1). Likewise the clock 11 is geared through gears 9, 10 to drive the time contact 17 across the length of the resistor 1 in any given time (10 hours in Figure 1). The logarithmic curve 4 shaped to the logarithmic base 10 in the figure has a very low electrical resistance, as nearly zero as possible. If reset of the device is desired at any given time, the movable slide members 15 and 16 may be returned to their initial positions by the reset means 37.

The only requirement for precise measurements is that all resultant values of resistance for the same average miles per hour are equal. In the example shown in Figure 1, if the vehicle has travelled sixty miles in one hour, the current path for the resistor circuit is through lead-in wire 21, through contact 17 and through the portion marked "X" of the one hour resistance bar, across the portion of logarithmic curve 4 between the one hour bar and the 60 mile bar, through the portion marked "Y" of the 60 mile bar and the contact 18, through the wire 22 and the ammeter 24 to the power source.

For the example above of sixty miles covered in one hour, the resistance value X between the upper edge of the one hour bar and the point of contact of curve 4 with the one hour bar is 40 ohms, and the resistance value Y between the lower edge of the 60 mile bar and the logarithmic curve is 53.5 ohms, making the total circuit resistance 93.5 ohms.

If 30 miles were covered in one-half an hour, the resistance covered for 30 miles on the 30 mile bar would be 44.5 ohms and the resistance for one-half an hour would be 49 ohms, making again a total resistance of 93.5 ohms. If 90 miles were covered in one and one-half hours, the resistance for the 90 mile bar would be 58.5 ohms and the resistance for the one and one-half bar would be 35 ohms, making the total again 93.5 ohms.

Other examples are:

|   |   | Ohms |
|---|---|---|
| (a) | 50 mile resistance | 51 |
|   | 1 hour resistance | 40 |
|   | Total resistance | 91 |
| (b) | 100 miles in 2 hours: |   |
|   | 100 mile resistance | 60 |
|   | 2 hour resistance | 31 |
|   |   | 91 |
| (c) | 75 miles in 1½ hours: |   |
|   | 75 mile resistance | 56 |
|   | 1½ hour resistance | 35 |
|   |   | 91 |

If the average miles per hour are to be calculated for greater distances and greater periods of time, the hour scale could be likewise calibrated for 24 hours and the milage scale could be calibrated for 2000 miles or any other desired value.

Thus it may be seen that my invention provides an inexpensive, durable, accurate instrument utilizing logarithmic resistance means for indicating the average miles per hour of a vehicle over a given period of time.

While according to the statutes I have described my invention to the best of my ability, it is to be understood that the embodiment described above is merely illustrative of the principles thereof and that numerous other changes and modifications may be devised by those skilled in the art, and it is intended in the appended claims to cover all such changes and modifications which fall within the true spirit and scope of this invention.

What I claim is:

1. An electrical indicating device comprising a resistor, said resistor having an insulated supporting member, a plurality of resistance bars secured to said member, and a current conducting curve connecting said bars intermediate their ends, said curve having a configuration corresponding to a desired logarithmic function; a first contact slidably movable across said resistance bars on one side of said curve; a second contact slidably movable across said resistance bars on the other side of said curve; means for independently moving said contacts across said bars in accordance with variable quantities the function of which it is desired to measure; a source of electrical power; circuit means connecting said movable contacts in series with said power source so that a current path is created from one of the contacts to the other through the resistance bar contiguous with the first contact, a portion of the current conducting curve, and the second bar contiguous with the second contact; and indicating means in said connecting means for indicating the instantaneous value of resistance between said movable contacts as said contacts independently traverse said resistor.

2. An average speed indicating device for use in vehicles comprising a logarithmic resistor having a supporting member, a plurality of resistance bars secured to said member, and a current conducting curve having a configuration corresponding to a desired logarithmic function connecting said bars intermediate their ends; a first movable contact slidably movable across said resistor; means for moving said contact across said resistor at a rate proportional to the distance covered by the vehicle; a second movable contact slidably movable across said resistor; means for moving said second contact across said resistor at a rate proportional to the time required by the vehicle to cover said distance, a source of electrical power, circuit means connecting said movable contacts to said power source, and indicating means connected in said circuit means whereby the instantaneous resistance between said contacts as shown by said indicating means is a function of the average speed of the vehicle.

3. An average speed indicating device as defined in claim 2 wherein said resistance bars secured to said supporting member are coplanar.

4. An average speed indicating device as defined in claim 3 wherein said resistance bars secured to said supporting member are parallel.

5. An average speed indicating device as defined in claim 2 wherein said first movable contact traverses said bars on one side of said curve and said second movable contact traverses said bars on the other side of said curve.

6. An average speed indicating device as defined in claim 2 including reset means for returning said movable contacts to their original positions on said resistor.

References Cited in the file of this patent

UNITED STATES PATENTS 1,971,238    Silling    Aug. 21, 1934